United States Patent
Mäder

(10) Patent No.: US 11,623,360 B2
(45) Date of Patent: Apr. 11, 2023

(54) DOUBLE CUTTING DISC WITH CURVED DEFORMATION LINES

(71) Applicant: TECHNISCHE UNIVERSITÄT MÜNCHEN, Munich (DE)

(72) Inventor: Marcus Mäder, Munich (DE)

(73) Assignee: TECHNISCHE UNIVERSITÄT MÜNCHEN, Munich (DE)

(*) Notice: Subject to any disclaimer, the term of this patent is extended or adjusted under 35 U.S.C. 154(b) by 51 days.

(21) Appl. No.: 16/620,980

(22) PCT Filed: Jun. 22, 2018

(86) PCT No.: PCT/EP2018/066767
§ 371 (c)(1),
(2) Date: Dec. 10, 2019

(87) PCT Pub. No.: WO2018/234547
PCT Pub. Date: Dec. 27, 2018

(65) Prior Publication Data
US 2020/0108519 A1    Apr. 9, 2020

(30) Foreign Application Priority Data
Jun. 23, 2017  (EP) .................... 17177641

(51) Int. Cl.
*B26D 1/00*   (2006.01)
(52) U.S. Cl.
CPC .... *B26D 1/0006* (2013.01); *B26D 2001/0033* (2013.01); *B26D 2001/0053* (2013.01)
(58) Field of Classification Search
CPC ............ B26D 1/0006; B26D 1/00; B26D 2001/0053; B26D 2001/0033; B26D 2001/0046; B23D 61/026; B24D 5/10
(Continued)

(56) References Cited

U.S. PATENT DOCUMENTS

| 4,187,754 A | 2/1980 | Beaty | |
| 2003/0000363 A1* | 1/2003 | Hofmann | B23D 45/165 83/837 |

(Continued)

FOREIGN PATENT DOCUMENTS

| CN | 101518838 A | 9/2009 |
| CN | 201471006 U | 5/2010 |

(Continued)

OTHER PUBLICATIONS

International Searching Authority/European Patent Office, International Search Report and Written Opinion of the International Searching Authority, Application No. PCT/EP2018/066767, dated Sep. 6, 2018, 14 pages.

(Continued)

*Primary Examiner* — Nhat Chieu Q Do
(74) *Attorney, Agent, or Firm* — Sunstein LLP

(57) ABSTRACT

A rotary cutting disc (10) comprising two coaxial mutually opposed disc-shaped elements (12a, 12b) each having a circumferential edge, wherein circumferential edges (14a, 14b) of the disc-shaped elements (12a, 12b) are joined together forming a cutting edge (16) of the cutting disc (10); wherein each of the disc-shaped elements (12a, 12b) comprises one or more at least partly curved elongated deformation lines (30), wherein the one or more deformation lines (30) have a radial distance from the centre (26) of the cutting disc (10) that increases along at least a part of the length of the deformation line (30). The rotary cutting disc (10) has an increased critical speed that allows improving the efficiency of a cutting operation with a cutting disc while maintaining acceptable levels of quality, cutting precision and safety.

21 Claims, 11 Drawing Sheets

(58) Field of Classification Search
USPC .......................................... 83/214, 676, 469
See application file for complete search history.

(56) References Cited

U.S. PATENT DOCUMENTS

| | | | |
|---|---|---|---|
| 2003/0136242 A1* | 7/2003 | Hofmann | B23D 61/026 83/853 |
| 2010/0126322 A1* | 5/2010 | Friedrichs | B23D 65/00 83/171 |

FOREIGN PATENT DOCUMENTS

| | | | | |
|---|---|---|---|---|
| EP | 1 130 126 A2 | 9/2001 | | |
| EP | 2799176 A1 * | 11/2014 | ........... | B23D 61/026 |
| JP | H02 311260 A | 12/1990 | | |
| JP | H02311260 A | 12/1990 | | |
| JP | H03 104608 A | 5/1991 | | |
| JP | H06 312314 A | 11/1994 | | |
| JP | H10 180539 A | 7/1998 | | |

OTHER PUBLICATIONS

European Patent Office, Extended European Search Report, Application No. 17177641.2, dated Dec. 4, 2017, 28 pages.

* cited by examiner

DOUBLE CUTTING DISC WITH CURVED DEFORMATION LINES

CROSS-REFERENCE TO RELATED APPLICATIONS

This application is the national phase entry of international patent application no. PCT/EP2018/066767 filed Jun. 22, 2018, which claims priority to European patent application no. 17177641.2 filed Jun. 23, 2017, the disclosures of which are incorporated herein by reference in their entirety.

FIELD OF THE INVENTION

The present invention is related to a cutting disc or diamond blade for cutting materials. More particularly, the present invention relates to a cutting disc with a novel configuration allowing for improved dynamical properties of the cutting disc in operation.

BACKGROUND OF THE INVENTION

Rotary cutting discs are widely employed in different fields of technology for cutting purposes. Cutting discs of relatively small dimensions in the submillimetric range are used for medical purposes, for example in the field of odontology. Cutting discs having diameters in a range from approximately 50 cm to as large as 2 m are used for instance in the fields of metallurgy, civil construction and wood processing for cutting a variety of materials.

In a continued effort to increase the efficiency of cutting operations by cutting tools making use of cutting discs, manufacturers of cutting discs aim at an increasingly thinner shape thereof. Thinner cutting discs generally allow cutting through objects in shorter times and with less power consumption, as less material of the object being cut needs to be removed. However, these efforts are faced with technical limitations with regard to the mechanical properties of the tool and its dynamic behaviour in operation, for the cutting disc must maintain structural integrity, dynamic stability and withstand centrifugal and transversal forces.

Rotating machinery, as any dynamical system, is exposed to vibrations and deformations depending for instance upon structural properties thereof, possible functioning faults and force imbalances. A thin rotary cutting disc rotating in a physical environment may severely deform when subjected to loss of dynamical stability and to arising resonances. This may result in a widening and a deviation of the intended cutting line, such that the final cutting line may in some instances be several times wider than the width of the cutting disc, which leads to increased material consumption, reduced cutting precision, increased wear of the cutting disc and increased power consumption. Further, this undesired stability loss may lead to fatal mechanical disruptions of the cutting disc itself or the surrounding machinery as a result of increased forces transversal to the cutting line. For example, the cutting disc may penetrate sideways into the material being cut along a direction perpendicular to the cutting line, which may cause severe damage to the cutting disc or cause the cutting disc to remain trapped and/or bent upon turning off the cutting machine.

It is seen in practice that there is typically a rotation frequency above which the disc of the cutting machine exhibits a large deformation, leading to an undesired increase in the width of the cut, excessive wear or even breakage of the disc upon operation. This frequency is referred to as "critical frequency" herein. Clearly, by restricting the rotational speed of the cutting disc to frequencies below this critical frequency, the efficiency of the cutting tool is likewise limited. Hence, there is a strong demand in the art to provide cutting discs with an extended range of operable rotational speeds.

SUMMARY OF THE INVENTION

It is an object of the present invention to provide a rotary cutting disc for a cutting tool machine with an improved structural stability overcoming the above technical disadvantages and allowing for an increased maximal feasible rotational speed of the cutting disc. This is achieved by a cutting disc according to claim 1 and by a cutting disc according to claim 19. Preferable embodiments of the invention are captured by the dependent claims.

The dynamical stability of the cutting disc is governed by its vibrational modes. Namely, as any mechanical object with some degree of elasticity, the cutting disc will exhibit certain vibrational modes in which the cutting disc can exhibit standing wave deformation vibrations at corresponding mode frequencies. These modes are usually referred to as "resonances" in the art, and the corresponding frequency is referred to as the "resonance frequency" or, from a mathematical perspective, "eigenfrequency" of the disc.

When the disc is at rest, i.e. not rotating, the formation of the vibrational modes is well understood, and the shape and frequency of the vibrational modes may be predicted using suitable computer simulations. However, when the disc is rotating, the situation becomes more complicated. It is seen that individual vibrational modes of the disc when at rest split up into two vibrational modes for the rotating disc, when observed from the stationary reference frame, i.e. the reference frame of the object to be cut by the rotating disc. This split leads to one vibrational mode with higher and one vibrational mode with lower frequency than the mode frequency of the cutting disc at rest. The mode frequencies are found to diverge with increasing rotational speed, and it is seen that at some rotation frequency, which corresponds to the "critical frequency" referred to in the introductory portion above, the resonance frequency of one of the "split modes" becomes zero. This means that, as observed from the stationary reference frame, the cutting blade becomes statically deformed, and in this case the cutting blade is no longer operable for obvious reasons, as it would no longer "fit" into a cut of normal size. Accordingly, the aforementioned "critical frequency" indeed sets an upper limit for the rotational speed of the cutting blade in operation, and thereby an upper limit for the cutting efficiency.

An intuitive way to understand the split-up of the vibrational modes upon rotation of the disc is as follows. As the skilled person is aware, a vibrational mode is essentially a standing wave, which is in turn the result of the superposition of two counter directional waves. In the case of a disc, a standing wave can be generated by circumferential deformation waves propagating in clockwise and counter clockwise directions, respectively. When the disc rotates e.g. in clockwise direction, as observed from the stationary frame of reference, the speed of the waves propagating in clockwise direction is increased, while the speed of the wave propagating in counter clockwise direction is decreased, such that a split of the resonance frequencies may not come as a surprise. However, the analysis of the true behaviour is more complicated, because the rotation of the disc is an accelerated motion, and the disc itself therefore cannot serve as an inertial frame of reference. In order to understand the dynamical behaviour of the rotating disc, one can therefore not simply solve the equations of motions for the vibrations of the disc at rest and then transform the resulting dynamic behaviour with a simple rotation in space. Instead, in order to properly analyse the vibrational behaviour of the rotating disc, the full continuum mechanics problem of the rotating disc has to be solved.

The present inventor has carried out simulations of this full continuum mechanics problem regarding the deformation of the rotating disc and was able to determine the vibrational modes, as well as the corresponding frequencies, as a function of the rotational speed. With this insight into the dynamical behaviour of the continuum mechanics of the rotating disc, the inventor was able to establish a new design for a cutting disc, as set forth in claim 1 below, that permits increasing the critical frequency considerably as compared to discs of conventional design.

More particularly, a rotary cutting disc according to the invention comprises two coaxial mutually opposed disc-shaped elements each having a circumferential edge, wherein circumferential edges of the disc-shaped elements are joined together forming a cutting edge of the cutting disc. Thus, the cutting disc is formed by the union of the two disc-shaped elements, wherein each disc-shaped element constitutes one half of the cutting disc. The circumferential edges of the disc-shaped elements are joined together forming a common circumferential edge that constitutes the cutting edge of the cutting disc, that is, the outermost edge of the cutting disc that is rotated against the material to be cut. The cutting edge may constitute the cutting surface of the cutting disc itself or may be used for accommodating any kind of cutting blades, teeth or the like on it.

It is noteworthy that, while reference is made herein to a cutting disc comprising two coaxial mutually opposed disc-shaped elements, configurations of the invention are foreseen in which the cutting disc comprises more than two disc-shaped elements. Further, as is clear to the skilled person, the term "disc-shaped" should not be construed to be restricted to perfectly planar and circular objects, but rather to extended objects having an outermost perimeter that may deviate from a perfect circle and having a thickness that is much smaller than the aforesaid perimeter.

Each of the disc-shaped elements comprises one or more at least partly curved elongated deformation lines, wherein the one or more deformation lines have a radial distance from the centre of the cutting disc that increases along at least a part of the length of the deformation line. Herein, "curved" refers to the fact that the deformation lines do not extend straight along the radial direction of the disc-shaped elements only, but rather have a radial component and a component perpendicular thereto (i.e. angular or circumferential component). "Partly curved" refers to the fact that such curved shape may correspond to the entire length of a deformation line or only to a portion thereof. The fact that the radial distance of the deformation lines increases along at least a part of the length of the deformation line implies that deformation lines according to this invention are not formed at a constant distance of the centre of the cutting disc, i.e. not ring-shaped. In terms of polar coordinates, the radial component of the deformation line would be dependent on the azimuthal phase. The deformation lines may for instance have a spiral form, a wavy form, any combination thereof, or any other partly curved form according to the above definition.

The deformation lines may be formed as deformations of the material of which the disc-shaped elements are made. Typically, the deformation lines are formed by exerting a mechanical pressure upon the material from both sides of the disc-shaped elements of the cutting disc thereby causing a plastic deformation. The deformation lines may for example be formed by a rolling process. Herein, the term "line" shall not be understood literally, because the rolling lines will have a certain non-vanishing width, which however is much smaller than the length of the deformation line, such as at least to times smaller, typically at least 20 times smaller. The formation of the deformation lines causes so-called residual stresses to be present in the material, which has a relevant influence on the dynamical properties of the cutting disc.

The inventor has realised that surprisingly the combination of the two-element design with the specific shape of the deformation lines causes an increase of the critical speed of the cutting disc in a synergistic manner, i.e. in a manner that exceeds by far the effect expected from each single design feature by itself. The increase in critical speed thanks to the cutting disc of the invention with respect to an analogous single-pieced cutting disc having the same diameter and total mass and having conventional annular deformation lines has been found to be of at least 33%, which results in a very significant increase in the cutting kinetical energy of more than 75%.

This way, the efficiency of a cutting operation with a cutting disc can be improved while maintaining acceptable levels of quality, cutting precision and safety. The aforesaid conclusions are supported by simulation results that are summarised below.

The dynamic behaviour of the cutting disc is governed by the rotational inertia tensor thereof. The rotational inertia tensor, also known as angular mass tensor, of a system describes the rotational inertia of the system and the degree to which a rotation around one axis induces a rotation around another axes, as is typically known for precession phenomena. The rotational inertia tensor $J_{ij}$ is a symmetric tensor of the form $$J = \begin{bmatrix} J_{xx} & J_{xy} & J_{xz} \\ J_{xy} & J_{yy} & J_{yz} \\ J_{xz} & J_{yz} & J_{zz} \end{bmatrix},$$

where the diagonal terms $J_{xx}$, $J_{yy}$, and $J_{zz}$, characterise the rotation inertia of the corresponding system around the axis x, y, and z, respectively, and the off-diagonal terms characterise the degree to which a rotation around one axis induces a rotation around another axis. In other words, the off-diagonal terms are a measure of the "rotation rigidity" of a rotating system. The smaller an off-diagonal term $J_{\alpha\beta}$ is, the less resistance the system offers for a rotation around the direction $\alpha$ to induce a further rotation around the direction $\beta$, and hence the less stable the system is when rotating.

The experiments by the inventor reveal that the aforesaid combination of the two element design with the specific shape of the deformation lines may influence the deformation behaviour of the cutting disc in such a way as to result in an increase in the off-diagonal terms of the rotational inertia tensor with respect to cutting discs of conventional design in as much as four orders of magnitude. While conventional cutting discs display off-diagonal terms of the inertia tensor having a typical order of magnitude of $10^{-13}$ as compared to the diagonal terms, the inventor found out that the inventive design of a cutting disc can result in off-diagonal terms of the rotational inertia tensor of the cutting disc having an order of magnitude of $10^{-9}$ or higher as compared to the diagonal terms. This may lead to a regime in which the deformation behaviour of the cutting disc may no longer be reliably approximated by a linear planar approximation, as would correspond to a symmetric and plane cutting disc. Instead, quadratic and higher terms become significant for the calculations, which contributes to the effective increase of the critical frequency of the cutting disc.

In a preferred embodiment of the invention the two disc-shaped elements form a cavity in between that contains a vacuum. According to this embodiment, the two disc-shaped elements are not continuously in contact with each other all along their respective radial length but instead are in contact with each other at their outermost circumferential edges, which jointly form the cutting edge of the cutting disc, and possibly in a neighbouring environment thereof, while they are mutually separated along the rest of their radial extensions corresponding to those portions of the disc-shaped elements that are not joined together forming the cutting edge of the cutting disc. An interspace between the two disc-shaped elements is then formed between these portions thereof which constitutes the cavity.

The cutting edge of the cutting disc may be provided by a sealed junction or connection between the disc-shaped elements. Further, the disc-shaped elements may be confined by an innermost circumferential edge around their common axis, which may for instance be formed around an opening suitable for accommodating a shaft. A sealed junction or connection may be provided between such an opening and the cavity between the disc-shaped elements, such that the cavity is a sealed cavity suitable for containing a vacuum. When the cavity is evacuated, i.e. it contains a vacuum, a pressure gradient is created between the interior of the cutting disc and the exterior thereof, which is believed to contribute to a better dynamical stability of the cutting disc in operation.

According to other preferred embodiments of the invention, the two disc-shaped elements form a cavity in between that is filled with a fluid, preferably with a Newtonian or a non-Newtonian fluid such as a gas-like air, an inert gas or a combination thereof, or a liquid like water, an oil, a gel-like substance or a combination thereof that improves the dynamic behaviour of the disc.

In other preferred embodiments of the invention, the two disc-shaped elements form a cavity in between that is filled with a damping material, preferably with a damping material with viscoelastic properties such as rubber, silicate, a gel, a synthetic or natural material with vibration attenuating properties or a combination thereof.

The presence of a vacuum, a fluid, or a damping material in the cavity may modify the dynamical properties of the cutting disc in an advantageous manner by increasing the damping behaviour and/or its mechanical resistance to uncontrolled deformations that may lead to deviations or irregularities of the cutting profile and contribute to the elevation of the critical rotational speed of the cutting disc.

In preferred embodiments of the invention, the disc-shaped elements are separated by a separating element. The separating element may contribute to a better static and dynamic stability of the cutting disc against deformations and vibrations. The separating element may be formed as an extension of the disc-shaped elements. Alternatively, the separating element may be an independent element. Further, the separating element may be formed along an inner circumferential edge of the disc-shaped elements and around an opening confined by said inner circumferential edge for receiving a shaft.

In some preferred embodiments of the invention, the separating element and/or the disc-shaped elements may be configured such that the disc-shaped elements assume a lens-shaped geometry, wherein the distance between the disc-shaped elements increases at least in part along the radial direction from the cutting edge towards the centre of the cutting disk. The distance between the disc-shaped elements may increase throughout their respective radial lengths or in a part thereof. The disc-shaped elements may assume the lens-shaped geometry in combination, such that the geometry of the rotary cutting disc is lens-shaped in the aforesaid sense. This may be achieved by appropriately choosing the dimensions and material composition of the separating element and/or by appropriately choosing the dimensions and/or the material composition of the disc-shaped elements.

The inventor realised that the lens-shaped geometry induced by the separating element and/or by the disc-shaped elements may further contribute to the aforementioned non-linear regime of the deformation behaviour of the cutting disc and hence to the increase of the critical frequency of the cutting disc.

For the purpose of implementing the lens-shaped geometry of the cutting disc described above, the separating element may be made of a monolithic material, for example a metal, or a composite material, and may have a width along the axial direction, i.e. an extension between the disc-shaped elements, of between $R/1000$ and $2R/3$, preferably between $R/100$ and $R/2$, more preferably between $R/10$ and $R/3$, where R is the radius of the disc-shaped elements. Additionally or alternatively, the disc-shaped elements may be made of a monolithic material, for example a metal, or a composite material.

The distance between the disc-shaped elements may increase along the radial direction from the cutting edge towards the center of the cutting disk, throughout their respective radial lengths or in a part thereof, linearly, logarithmically, exponentially, and/or according to a polynomial function, a trigonometric function and/or a rational function.

In a preferred embodiment of the invention, the one or more deformation lines formed on different disc-shaped elements are arranged in an overlaying configuration in the assembled state of the cutting disc. This means that the deformation lines as formed on the individual disc-shaped elements are mirror images of one another.

In a related embodiment, the pattern of deformation lines on the individual disc-shaped elements are mirror images of one another, such that they could be arranged in an overlaying configuration in the assembled state of the rotary cutting disc, but are offset with respect to each other by a predefined angle. The offset of the deformation lines may lead to an increased degree of asymmetry of the cutting disc, which may further contribute to influence the deformation behaviour of the cutting disc in such a way as to increase the critical frequency of the cutting disc, as explained above.

According to an alternative embodiment of the invention, the pattern of deformation lines as formed on the individual disc-shaped elements is identical. This means that in the assembled state, where the individual disc-shaped elements are arranged back-to-back, the location and shape of the deformation lines are mirror images of each other.

In some preferred embodiments of the invention, the one or more deformation lines are formed on an outer surface of the disc-shaped element not facing the opposed disc-shaped element.

According to a preferred embodiment of the invention, the radial distance of the one or more deformation lines increases monotonically along the length of the deformation line. The radial distance refers herein to the radial coordinate that would be used for describing the path of a deformation line on a disc-shaped element in polar coordinates, which would increase monotonically with increasing angle, i.e. along the length of the deformation line. This characteristic may extend to an entire deformation line or only to a portion thereof. The monotonic increase may for instance correspond to a linear increase or to a logarithmic increase, although other increase rates are possible as well.

In a preferred embodiment of the invention, the deformation lines extend from a first end to a second end, said first end being located at the innermost circumferential edge of the disc-shaped elements, or within a distance of said innermost edge that is less than 15%, preferably less than 10% of the diameter of the respective disc-shaped element. According to this embodiment, the disc-shaped elements may be confined on one side by an innermost circumferential edge around their common axis, which may for instance be formed around an opening suitable for accommodating a shaft.

In a related embodiment of the invention, the second end of the deformation lines is located at the cutting edge, or within a distance from said cutting edge that is less than 15%, preferably less than 10% of the diameter of the respective disc-shaped element.

In a preferred embodiment of the invention, the two disc-shaped elements are welded or glued together. In particular, the disc-shaped elements may be welded together by means of point welding, line welding, friction welding, soldering, or glued together using a gluing paste.

According to a preferred embodiment of the invention, each of the disc-shaped elements comprises at least 4 deformation lines, preferably between 6 and 20 deformation lines.

In a preferred embodiment of the invention the deformation lines, when expressed in polar coordinates, cover an angular range between 1° and 720°, preferably between 10° and 90°, along their length.

Herein, it is preferable if the value of the angle coordinate increases or decreases monotonically along the length of the deformation line. Additionally or alternatively, the deformation lines preferably have the shape of a section of a circle having a centre located at a radial distance from the centre of the rotary cutting disc corresponding to 35% to 65%, preferably 40% to 60% and most preferably 45% to 55% of the radius of the rotary cutting disc.

BRIEF SUMMARY OF THE FIGURES

FIG. 1a shows a side sectional view of a cutting disc according to an embodiment, in which a space between the disc-shaped elements forms a cavity that is filled with vacuum. FIG. 1b shows a side sectional view of a cutting disc according to an embodiment of the invention including a fluid. FIG. 1c shows a side sectional view of a cutting disc according to an embodiment of the invention including a damping material.

FIG. 2a shows one side of a cutting disc according to an embodiment of the invention. FIGS. 2c and 2d show the other side of the cutting disc of FIG. 2a according to respective embodiments of the invention. FIG. 2b shows one side of a cutting disc according to another embodiment of the invention.

DESCRIPTION OF PREFERRED EMBODIMENTS

Certain embodiments of the present invention are described in detail herein below with reference to the accompanying drawings, wherein the features of the embodiments can be freely combined with each other unless otherwise described. However, it is to be expressly understood that the description of certain embodiments is given by way of example only, and that it should not be understood to limit the invention.

Figure 1A:
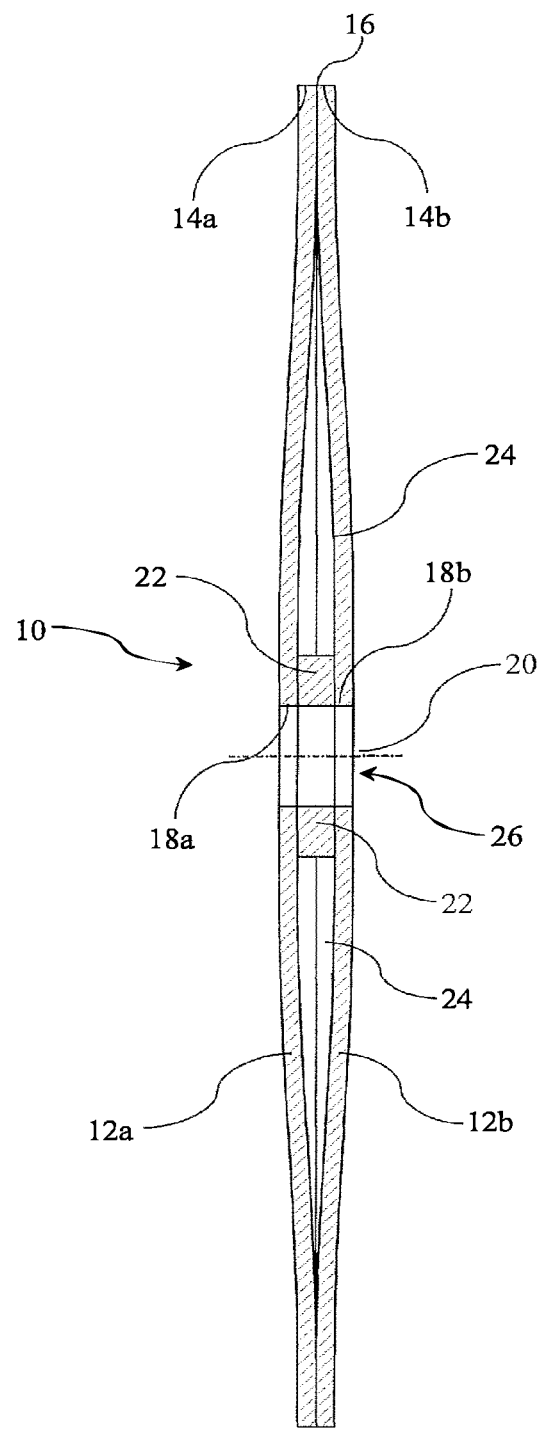
FIGS. 1a-1c show side sectional views of a cutting disc according to embodiments of the invention.

FIG. 1a shows a side view of a rotary cutting disc 10 according to an embodiment of the invention, which comprises two coaxial mutually opposed disc-shaped elements 12a and 12b. The disc-shaped elements 12a and 12b have a respective circumferential edge 14a and 14b. The circumferential edges 14a and 14b of the disc-shaped elements 12a and 12b are joined together forming a cutting edge 16 of the cutting disc 10. The disc-shaped elements 12a, 12b extend between a respective innermost circumferential edge 18a, 18b of the disc-shaped elements 12a, 12b and the respective outermost circumferential edge 14a, 14b. The innermost circumferential edges 18a, 18b are arranged around their common centre 20, and form an opening 26 suitable for receiving a driving shaft. The disc-shaped elements 12a and 12b are separated in a vicinity of their innermost circumferential edges 18a, 18b by a separating element 22.

The circumferential disc-shaped elements 12a and 12b are tightly joined together at the cutting edge 16 and tightly joined to the separating element 22 and the outer walls of the opening 26, thereby forming a sealed cavity 24 between the disc-shaped elements 12a and 12b. In the embodiment shown, the cavity 24 contains a vacuum.

The separating element 22 and the disc-shaped elements are configured such that the disc-shaped elements 12a and 12b assume in combination a lens-shaped geometry, wherein the distance between the disc-shaped elements 12a and 12b increases along the radial direction from the cutting edge 16 towards the common centre 20, according to a tangent function. The separating element 22 is made of a monolithic metal and has a width of R/5, R being the radius of the disc-shaped elements 12a and 12b. The disc-shaped elements 12a and 12b are made of a metal.

Figure 1B:
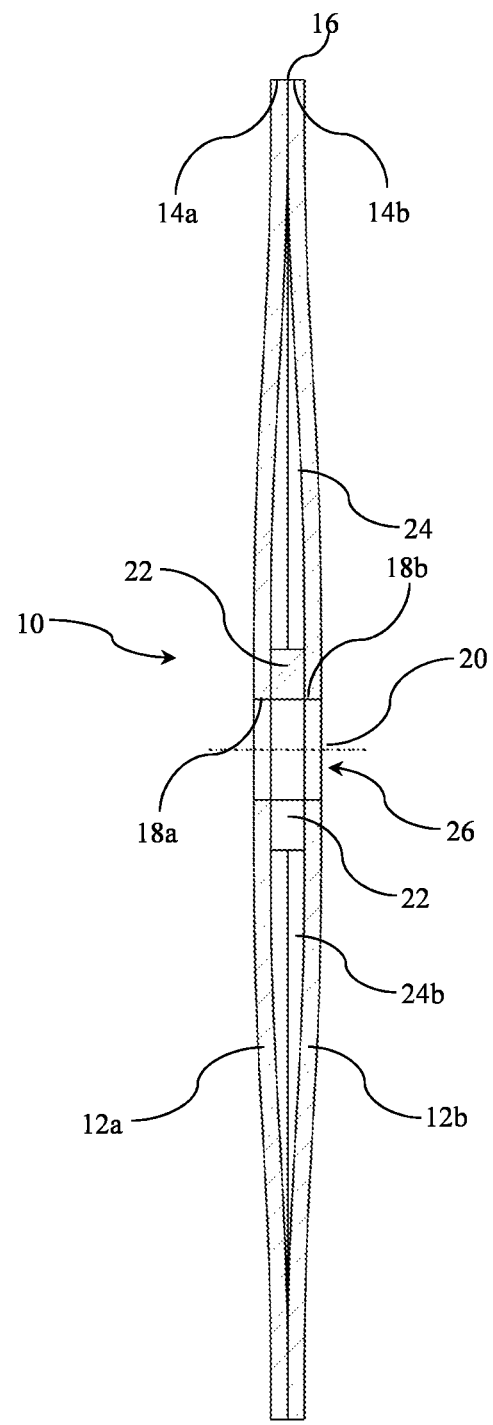
Figure 1C:
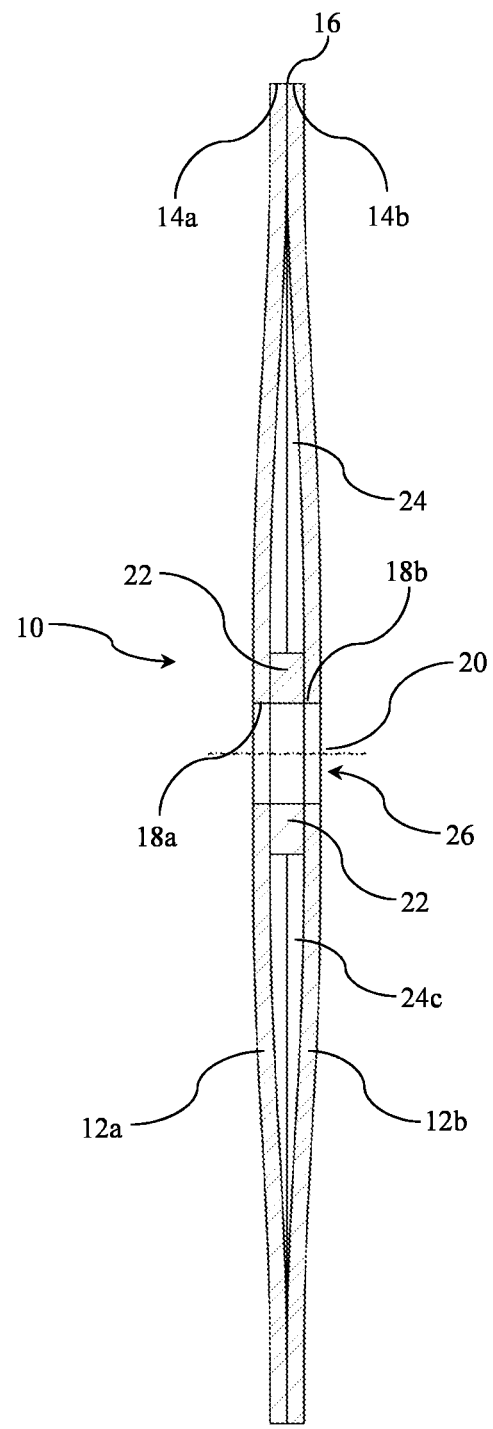
Figure 2A:
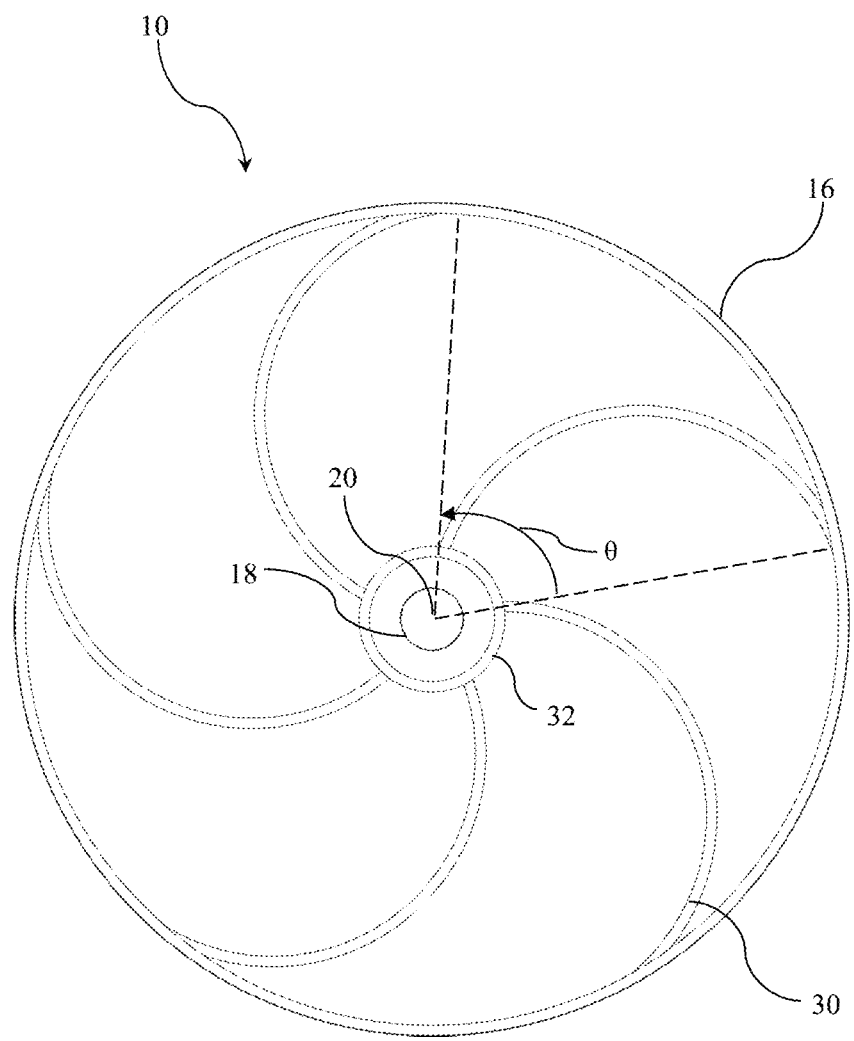
FIGS. 2a-2d show a front view of a cutting disc according to embodiments of the invention.
Figure 2B:
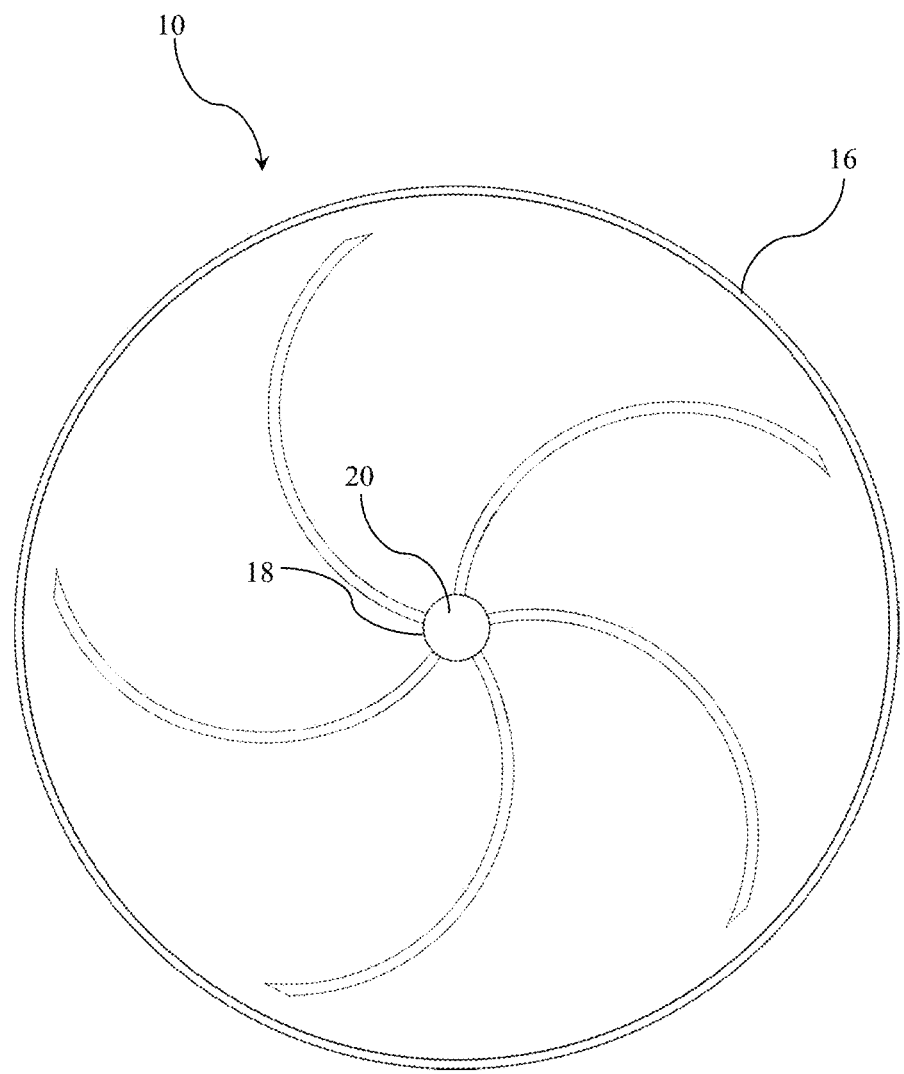

FIG. 2a shows a front side of the rotary cutting disc 10 of FIG. 1. The disc-shaped elements 12a and 12b each comprise five curved elongated deformation lines 30 that have a radial distance to the centre 20 of the cutting disc 10 that increases monotonically along the length of the deformation line 30. The deformation lines 30 of the embodiment shown are "spiral-shaped", which however shall not be construed in a strict mathematical sense. In the shown embodiment, the deformation lines 30 have the shape of a section of a circle having a centre located at a radial distance from the centre 20 of the disc-shaped element corresponding to half the radius R of the disc-shaped element. In the embodiments shown the radius R of the disc-shaped elements 12a, 12b is R=400 mm and the centre of the circular path described by the deformation lines 30 is located at a radial distance r=R/2=200 mm, and the deformation lines follow circular paths having a radius r=200 mm. Please note that this shape is regarded as a "spiral-shaped" in the meaning of the present disclosure. According to this shape, when expressing the shape of the deformation line 30 in polar coordinates, this means that the angle coordinate changes monotonically along the length of the deformation line 30, and thereby covers an angular range θ of approximately 80°. The deformation lines 30 extend between an intermediate circumferential limit 32 and the cutting edge 16, wherein the intermediate circumferential limit 32 encloses the centre of the cutting disc 10 and has a radius greater than the radius 18 of the innermost circumferential edges 18a, 18b of the disc-shaped elements 12a and 12b. In the embodiment shown, the deformation lines 30 have a width of 5.4 mm. As shown in FIG. 2b, in other related embodiments, the deformation lines 30 extend between the innermost circumferential edge 18 and a radial position located within a distance from the cutting edge 16 that is less than 15% of the diameter of respective disc-shaped element 12.

According to this shape, when expressing the shape of the deformation line 30 in polar coordinates, this means that the angle coordinate changes monotonically along the length of the deformation line 30, and thereby covers an angular range of approximately 80°. The deformation lines 30 extend between an intermediate circumferential limit 32 and the cutting edge 16, wherein the intermediate circumferential limit 32 encloses the centre of the cutting disc 10 and has a radius greater than the radius 18 of the innermost circumferential edges 18a, 18b of the disc-shaped elements 12a and 12b. In the embodiment shown, the deformation lines 30 have a width of 5.4 mm.

As shown in FIG. 1b, in other related embodiments, a space between the circumferential disc-shaped elements 12a and 12b is filled with a fluid 24b.

As shown in FIG. 1c, in other related embodiments, a space between the circumferential disc-shaped elements 12a and 12b is filled with a damping material 24c with viscoelastic properties.

Simulation Examples

In the following, it will be demonstrated that the configuration of the cutting disc according to this invention allows for an increase in the critical speed based on simulation results.

Figure 3:
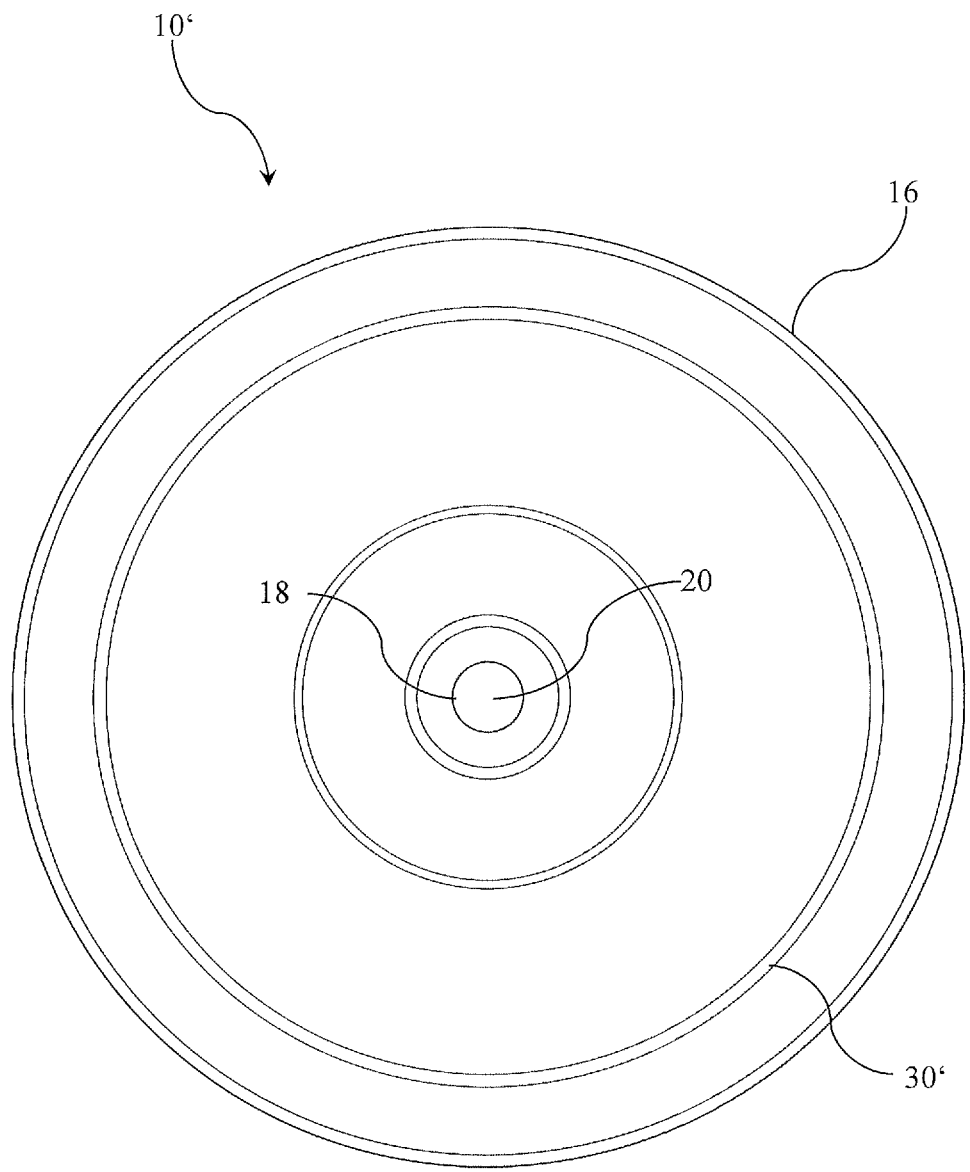
FIG. 3 shows a monolithic prior art cutting disc having closed annular deformation lines taken as reference.
Figure 4:
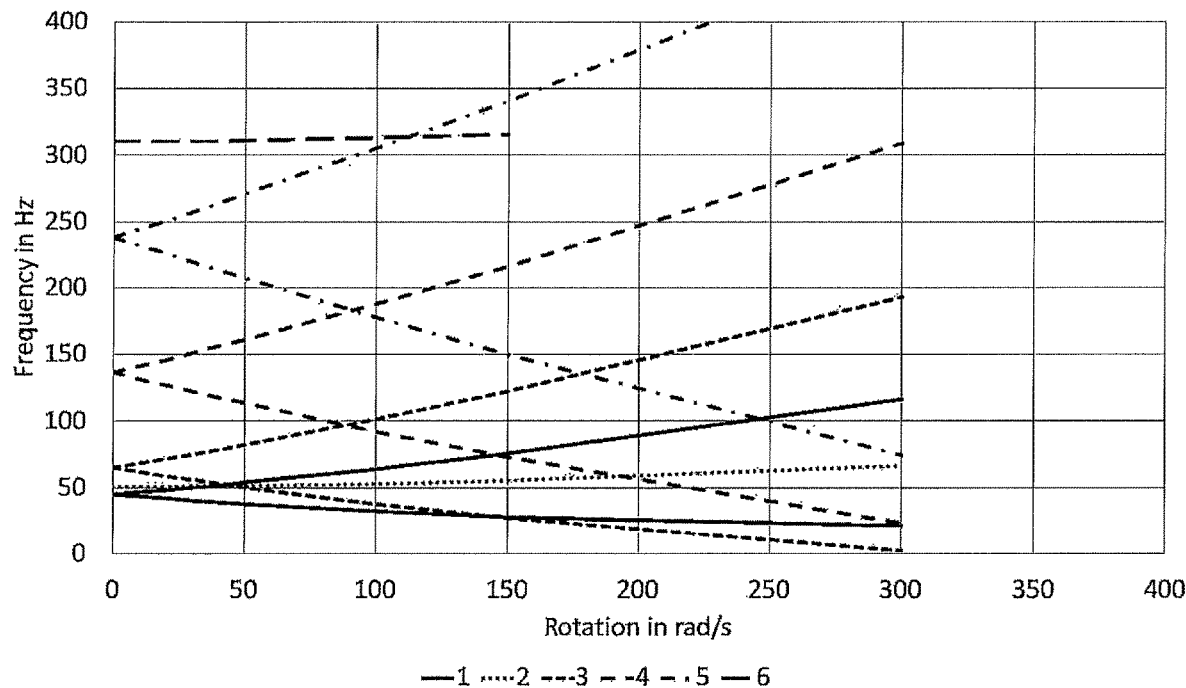
FIG. 4 shows the six lowest resonance frequencies as a function of rotational speed determined from computer simulation for the monolithic reference prior art cutting disc of FIG. 3.

FIG. 4 shows the six lowest resonance frequencies as a function of rotational speed determined from computer simulation for a reference prior art disc consisting of a monolithic cutting disc that is not made up from two coaxial mutually opposed disc-shaped elements, and comprising two annular deformation lines. Such a reference prior art disc 10' is shown in FIG. 3, where elements of the disc 10' are indicated by the same reference numerals previously used for FIGS. 1 and 2, wherein it is understood that those elements previously referring to the disc-shaped elements refer in FIG. 3 to the monolithic cutting disc itself. The cutting disc 10' comprises two concentric annular deformation lines 30'.

As is seen in the diagram of FIG. 4, the first, third, fourth and fifth lowest resonance frequencies for the cutting disc 10 when at rest bifurcate and diverge with increasing rotational speed. The reason for this bifurcation behaviour is that these resonances or vibrational modes involve standing waves propagating counter directionally in circumferential direction. The second and sixth lowest resonance frequency do not bifurcate, as they involve standing waves propagating in radial direction only, which are not directly affected by the rotation. Accordingly, in the diagram of FIG. 4, the respective curves are approximately horizontal, indicating that the resonance frequency is indeed largely unaffected by the increase in rotational speed. However, a closer look reveals that the curves are not perfectly horizontal, but slightly increase with rotational speed. This is due to the fact that the centripetal force acting on the cutting disc upon rotation leads to a stiffening of the disc, and hence a higher resonance frequency.

Note that the computer program employed always limits the analysis to the six lowest resonance frequencies (or resonance frequency pairs, in case of bifurcating frequencies). This is why in FIG. 4 at around 150 rad/s, the frequency curve of the resonance which used to be the highest at zero rad/s stops, the reason being that at this rotation frequency another resonance frequency (not shown in the diagram), which had a higher frequency at lower rotational speeds, has dropped below it.

As can be further seen from FIG. 4, at 300 rad/s, the lower branch of the originally (i.e. at zero rad/s) third lowest frequency resonance drops to zero, meaning that this vibrational mode leads to a static deformation in the inertial reference frame of the object to be cut (or the inertial reference frame of the machine driving the cutting disc 10). Hence, this rotational speed of 300 rad/s corresponds to the critical frequency referred to above, which sets the upper limit for the operating speed of the cutting disc 10.

In order to allow for higher rotational speeds of the cutting disc 10, the aim is to push the critical frequency, i.e. the lowest rotational speed at which one of the resonance frequencies drops to zero, to higher values.

Figure 5:
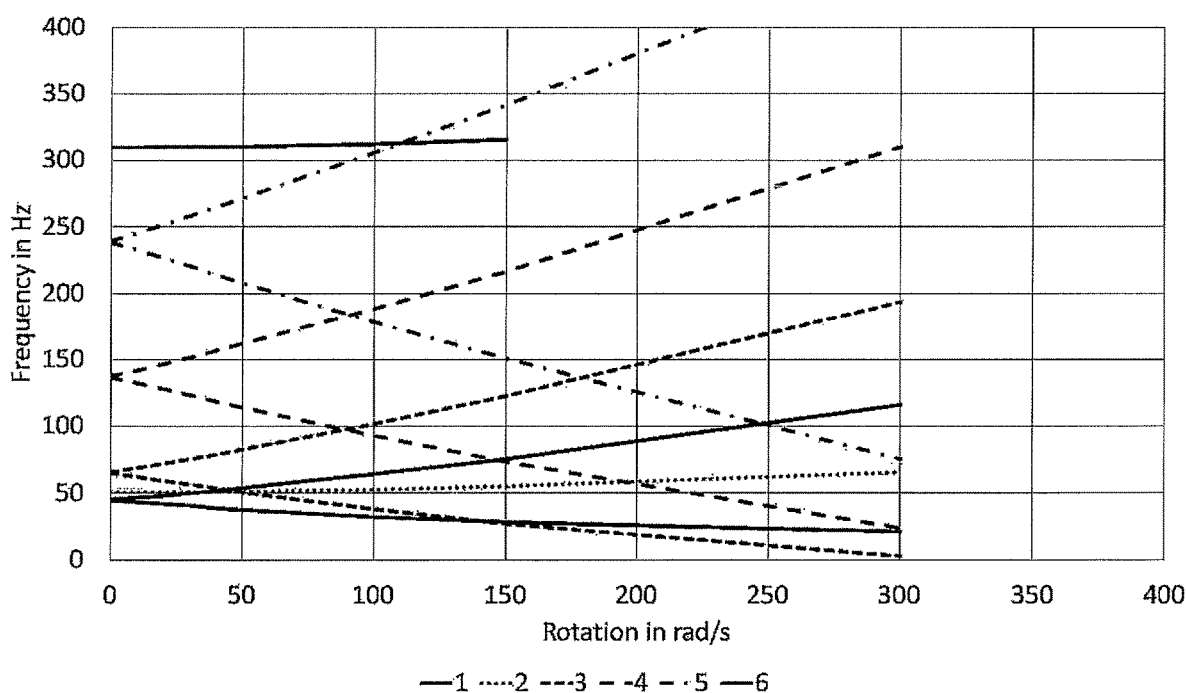
FIG. 5 shows the six lowest resonance frequencies as a function of rotational speed determined from computer simulation for a monolithic cutting disc comprising spiral shaped deformation lines.

FIG. 5 shows the results of similar simulations as shown in FIG. 4, again for a monolithic cutting disc, but having 5 spiral-shaped deformation lines instead of the two annular deformation lines analogous to the pattern of deformation lines 30 shown in FIG. 2. As seen in the figures, no significant changes in the dynamical properties of the cutting disc are observed. In particular, by employing the spiral-shaped deformation lines on a conventional, monolithic cutting disc, the critical rotational frequency remains at 300 rad/s and is hence not improved.

Figure 6:
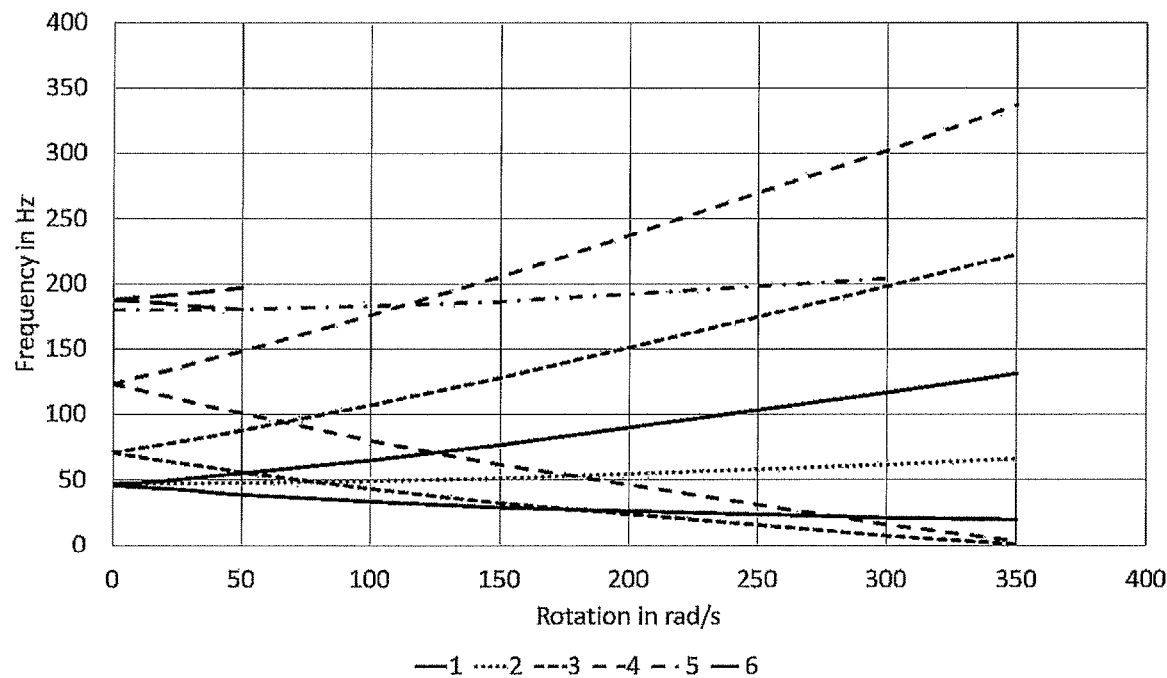
FIG. 6 shows the six lowest resonance frequencies as a function of rotational speed determined from computer simulation for a cutting disc comprising two disc-shaped elements without deformation lines.

FIG. 6 shows the results of similar simulations as shown in FIG. 4, but for a cutting disc comprising two disc-shaped elements separated by a separating element and having no deformation lines. The total mass of the two-part cutting disc is the same as that of the monolithic reference cutting disc of FIGS. 3 and 5. As seen in the figures, this configuration displays an increase in the critical frequency of about 17% with respect to the reference prior art model of FIG. 4.

Figure 7:
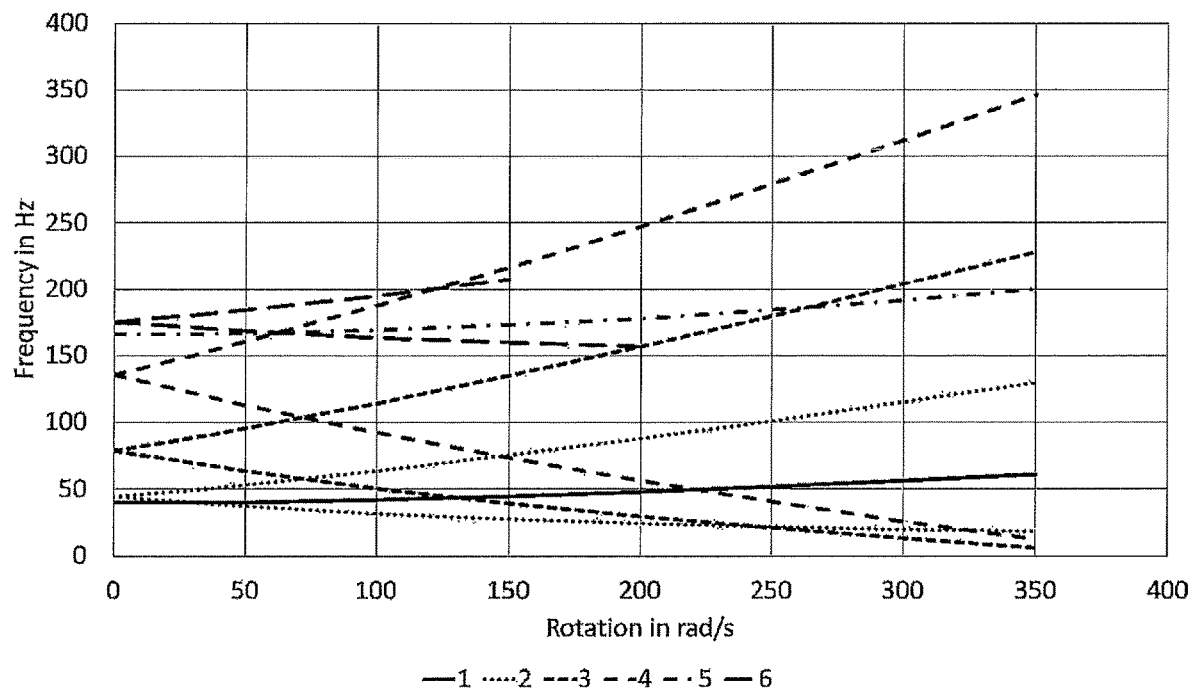
FIG. 7 shows the six lowest resonance frequencies as a function of rotational speed determined from computer simulation for a cutting disc comprising two disc-shaped elements having closed annular deformation lines.

FIG. 7 shows the results for a cutting disc analogous to that of FIG. 6 but comprising closed annular deformation lines around the centre of the cutting disc. The deformation lines on different disc-shaped elements are arrayed in an overlying configuration. No significant changes in the dynamical properties of the cutting disc as compared to that of FIG. 6 are observed which could be attributed to the closed annular deformation lines.

Figure 8:
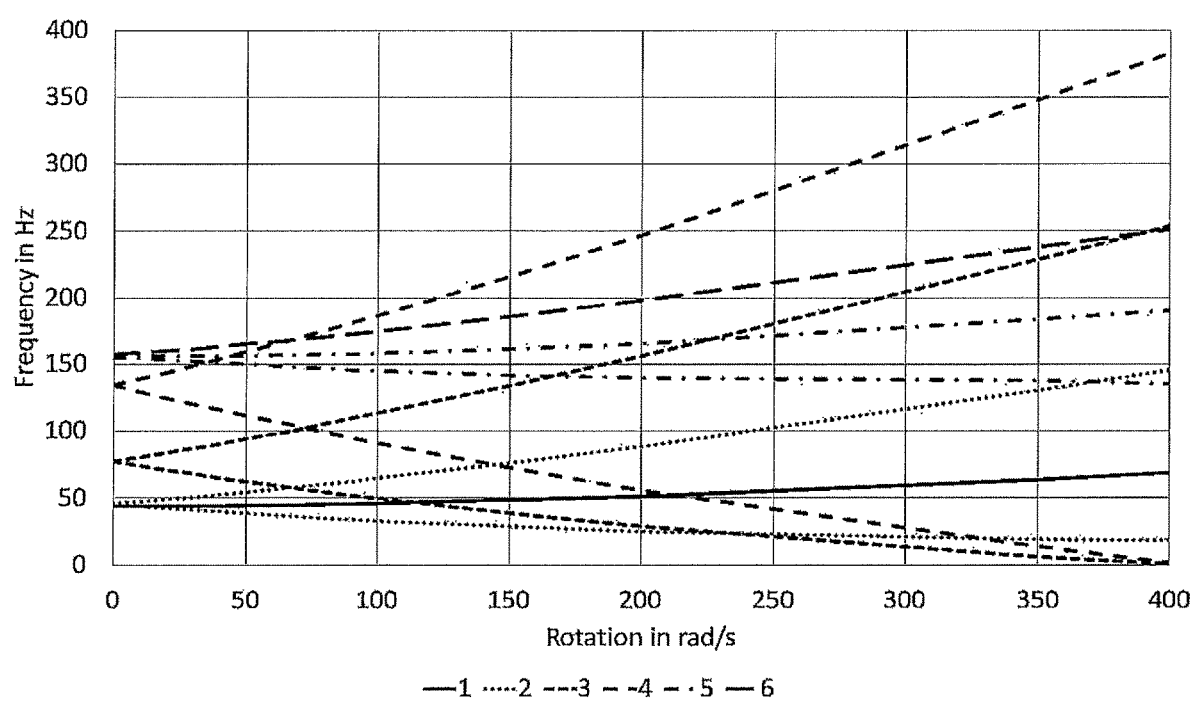
FIG. 8 shows the six lowest resonance frequencies as a function of rotational speed determined from computer simulation for a cutting disc according to an embodiment of the invention.

FIG. 8 shows the results of computer simulations of the six lowest resonance frequencies as a function of rotational speed determined for a cutting disc according to an embodiment of the invention. This embodiment is analogous to that of FIGS. 6 and 6, but comprises curved—spiral—deformation lines analogous to those described with respect to FIG. 2, wherein the deformation lines on different disc-shaped elements are arrayed in an overlying configuration. Surprisingly, the combination of the two-part structure and the curved spiral deformation lines leads to an increase in the critical frequency of about 33% over the prior art design shown in FIGS. 3 and 4. The combined effect is hence much more than one would have expected from the individual effects of the two modifications over the disc of FIGS. 3 and 4. After all, the two-part design without or with conventional annular deformation lines leads to an increase in critical frequency of only 17%, as is seen from FIGS. 6 and 7. Moreover, as seen from FIG. 5, the spiral cutting lines by themselves, i.e. applied on a conventional monolithic cutting disc of same mass does not lead to any appreciable improvement whatsoever. However, by combining the spiral shaped deformation lines with the two-part design of the cutting disc, a very significant increase in the critical frequency of about 33% with respect to the reference prior art model shown in FIG. 3 can be obtained, which clearly exceeds the sum of the individual effects of the individual features as seen by comparison with the critical frequency obtained in the cutting discs of FIGS. 5, 6 and 7.

Thanks to the increase in the critical frequency realised by the invention, the cutting disc may be operated at a higher rotational speed without being disturbed by the effects of resonance, which allows higher work efficiency and safety.

The simulations with which the results shown in FIG. 4 to 8 were obtained relied on a resolution of the elastic equations of motion (Lamé-Navier or Navier-Cauchy equations) by finite element computations and made use of the software tool Abaqus® by Dassault Systémes.

Figure 2C:
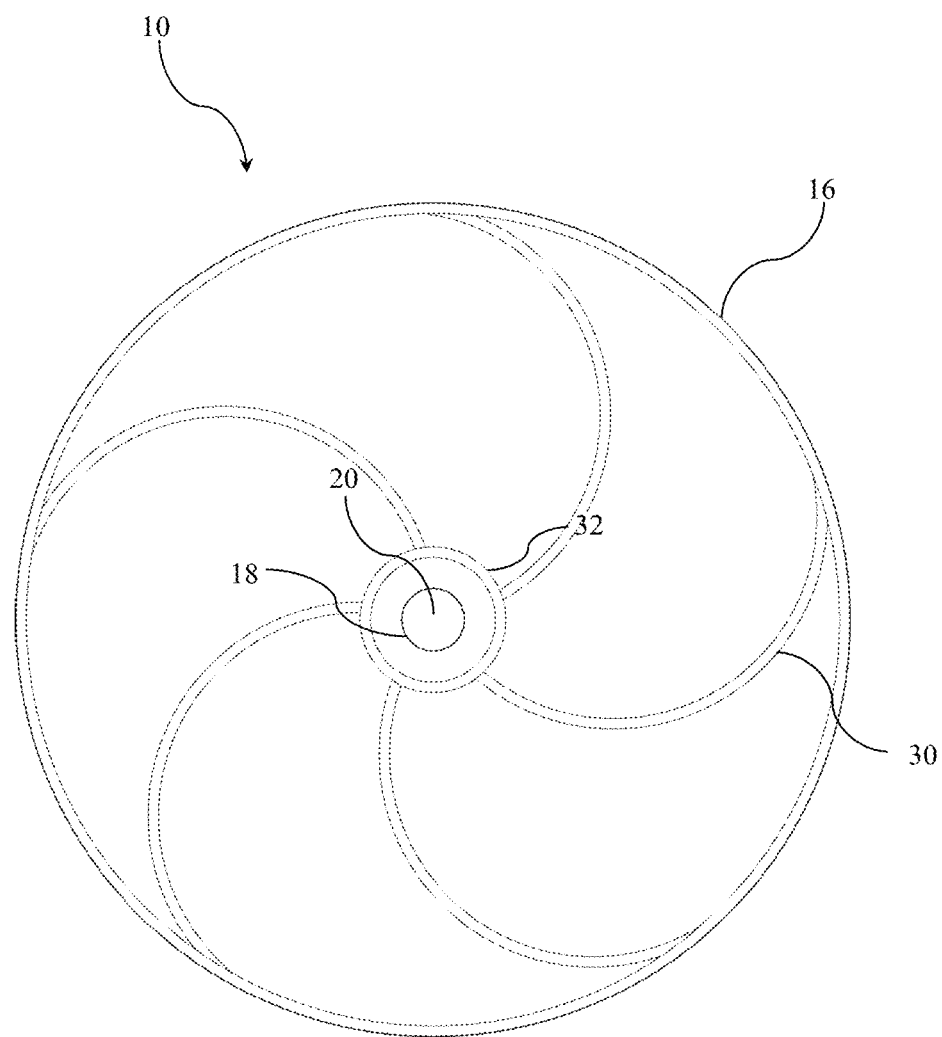

FIG. 2c shows the other side of the rotary cutting disc 10 shown in FIG. 2a for an embodiment in which the deformation lines 30 formed on different disc-shaped elements 12a, 12b (cf. FIG. 1) are arranged in an overlying configuration in the assembled state of the cutting disc 10, such that the deformation lines 30 as formed on the individual disc-shaped elements are mirror images of one another. Thus, FIGS. 2a and 2c are mirror images of each other.

Figure 2D:
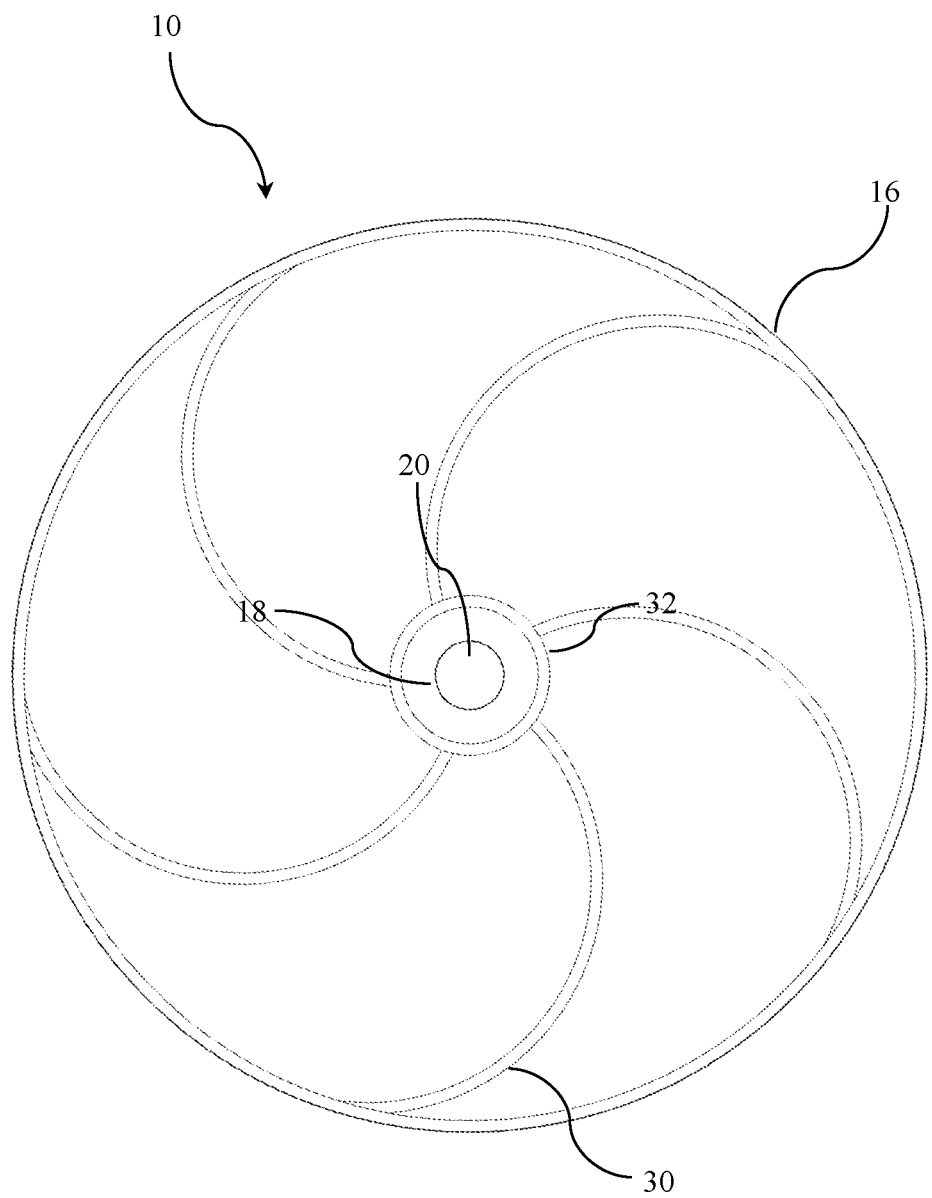

FIG. 2d shows the other side of the rotary cutting disc 10 shown in FIG. 2a for an embodiment in which the deformation lines 30 formed on different disc-shaped elements 12a, 12b (cf. FIG. 1) are arranged in an overlaying configuration offset with respect to each other by a predefined angle (compare FIG. 2a vs FIG. 2d).

It is to be understood that what is described above is what is presently considered the preferred embodiment of the present invention. However, it should be noted that the description of the preferred embodiments is given by way of example only and that various modifications may be made without departing from the scope of the invention as defined in the claims.

REFERENCE SIGN LIST 10 cutting disc
12a, 12b disc-shaped elements
14a, 14b circumferential edges
16 cutting edge
18a, 18b innermost circumferential edges
20 common centre
22 separating element
24 cavity
26 opening
30 deformation lines
32 intermediate circumferential limit

The invention claimed is:

1. A rotary cutting disc comprising:
two coaxial mutually opposed disc-shaped elements each having a circumferential edge, wherein the circumferential edges of the disc-shaped elements are bonded together forming a single cutting edge of the cutting disc, wherein the disc-shaped elements are directly in contact with each other at the cutting edge, such that the disc-shaped elements are joined to form the rotary cutting disc as a single cutting disc having a space between the disc-shaped elements, and wherein the cutting edge of the cutting disc is provided by a connection between the disc-shaped elements;
wherein each of the disc-shaped elements comprises one or more at least partly curved elongated deformation lines, wherein the one or more deformation lines have a radial distance measured from the center of the cutting disc that increases along at least a part of a length of the deformation line, wherein the deformation lines, when expressed in polar coordinates, cover an angular range between 1° and 720° along the length of the deformation lines.

2. The rotary cutting disc according to claim 1, wherein the space contains a vacuum.

3. The rotary cutting disc according to claim 1, wherein the space is filled with a fluid.

4. The rotary cutting disc according to claim 1, wherein the space is filled with a damping material with viscoelastic properties.

5. The rotary cutting disc according to claim 1, wherein the disc-shaped elements are separated by a separating element located in the space.

6. The rotary cutting disc according to claim 1, wherein the disc-shaped elements are configured such that the disc-shaped elements have a lens-shaped geometry, wherein a distance between the disc-shaped elements increases at least in part along the radial direction from the cutting edge towards the center of the cutting disc.

7. The rotary cutting disc according to claim 1, wherein the one or more deformation lines formed on one of the disc-shaped elements and the one or more deformation lines formed on the other one of the disc-shaped elements are arranged in an overlaying configuration, such that the one or more deformation lines formed on one of the disc-shaped elements and the one or more deformation lines formed on the other one of the disc-shaped elements are mirror images of each other.

8. The rotary cutting disc according to claim 1, wherein a pattern of the one or more deformation lines on one of the disc-shaped elements is a mirror image of a pattern of the one or more deformation lines on the other one of the disc-shaped elements, and wherein the pattern of the one or more deformation lines on said one of the disc-shaped elements is offset with respect to the pattern of the one or more deformation lines on said other one of the disc-shaped elements by a predefined angle.

9. The rotary cutting disc according to claim 1, wherein the one or more deformation lines are formed on an outer surface of the disc-shaped element not facing the opposed disc-shaped element.

10. The rotary cutting disc according to claim 1, wherein said radial distance of the one or more deformation lines increases monotonically along the length of the deformation line.

11. The rotary cutting disc according to claim 1, wherein the deformation lines extend from a first end to a second end, said first end being located at an innermost edge of the disc-shaped elements, or within a distance from said innermost edge that is less than 15% of the diameter of the respective disc-shaped element.

12. The rotary cutting disc according to claim 11, wherein the second end of the deformation lines is located at the cutting edge of the cutting disc, or within a distance from said cutting edge that is less than 15% of the diameter of the respective disc-shaped element.

13. The rotary cutting disc according to claim 1, wherein the two disc-shaped elements are welded or glued together.

14. The rotary cutting disc according to claim 1, wherein each of the disc-shaped elements comprises at least 4 deformation lines.

15. The rotary cutting disc according to claim 1, wherein the value of the angle coordinates increases or decreases monotonically along the length of the deformation line.

16. The rotary cutting disc according to claim 15, wherein the deformation lines, when expressed in the polar coordinates, cover an angular range between 10° and 90° along the length of the deformation lines, wherein the value of the angle coordinates increases or decreases monotonically along the length of the deformation line.

17. The rotary cutting disc according to claim 1, wherein the deformation lines have the shape of a section of a circle having a center located at a radial distance measured from the center of the rotary cutting disc corresponding to 35% to 65%, of the radius of the rotary cutting disc.

18. The rotary cutting disc according to claim 1, wherein the one or more at least partly curved elongated deformation lines have a width at least 10 times smaller than a length thereof.

19. A rotary cutting disc comprising:
two coaxial mutually opposed disc-shaped elements each having a circumferential edge, wherein the circumferential edges of the disc-shaped elements are bonded together forming a single cutting edge of the cutting disc;
wherein the each of the disc-shaped elements comprises one or more at least partly curved elongated deformation lines, wherein the one or more deformation lines have a radial distance measured from the center of the cutting disc that increases along at least a part of the length of the deformation line, wherein the deformation lines, when expressed in polar coordinates, cover an angular range between 10° and 90° along the length of the deformation lines,
wherein the disc-shaped elements are separated by a separating element, and wherein one or both of the separating element and the disc-shaped elements is/are configured such that the disc-shaped elements have a lens-shaped geometry, wherein the distance between the disc-shaped elements increases at least in part along the radial direction from the cutting edge towards the center of the cutting disc.

20. The rotary cutting disc of claim 1, wherein the one or more deformation lines have a radial distance from the center of the cutting disc that increases monotonically along the length of the deformation line,
wherein the one or more deformation lines formed on one of the disc-shaped elements and the one or more deformation lines formed on the other one of the disc-shaped elements are arranged in an overlaying configuration, such that the one or more deformation lines formed on one of the disc-shaped elements and the one or more deformation lines formed on the other one of the disc-shaped elements are mirror images of each other.

21. The rotary cutting disc according to claim 19, wherein the deformation lines, when expressed in the polar coordinates, cover said angular range between 10° and 90° along their length between a first end and a second end of the deformation line, said first end being located at an innermost edge of the disc-shaped elements, or within a distance from said innermost edge that is less than 15% of the diameter of the respective disc-shaped element and the second end of the deformation lines is located at the cutting edge of the cutting disc, or within a distance from said cutting edge that is less than 15% of the diameter of the respective disc-shaped element.

* * * * *

UNITED STATES PATENT AND TRADEMARK OFFICE
CERTIFICATE OF CORRECTION

PATENT NO. : 11,623,360 B2
APPLICATION NO. : 16/620980
DATED : April 11, 2023
INVENTOR(S) : Marcus Mäder It is certified that error appears in the above-identified patent and that said Letters Patent is hereby corrected as shown below:

In the Claims

Column 14 In Claim 20, Line 21:
"radial distance from" should read -- radial distance measured from --

Signed and Sealed this
Twelfth Day of December, 2023

Katherine Kelly Vidal
Director of the United States Patent and Trademark Office